United States Patent
Berke et al.

(10) Patent No.: US 10,095,438 B2
(45) Date of Patent: Oct. 9, 2018

(54) INFORMATION HANDLING SYSTEM WITH PERSISTENT MEMORY AND ALTERNATE PERSISTENT MEMORY

(71) Applicant: Dell Products L.P., Round Rock, TX (US)

(72) Inventors: Stuart Allen Berke, Austin, TX (US); John Erven Jenne, Austin, TX (US); Shane Michael Chiasson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 14/834,228

(22) Filed: Aug. 24, 2015

(65) Prior Publication Data

US 2017/0060697 A1 Mar. 2, 2017

(51) Int. Cl.
| | |
|---|---|
| *G06F 1/30* | (2006.01) |
| *G06F 3/06* | (2006.01) |
| *G06F 12/00* | (2006.01) |
| *G06F 11/14* | (2006.01) |
| *G06F 11/20* | (2006.01) |

(52) U.S. Cl.
CPC ............ *G06F 3/0647* (2013.01); *G06F 3/068* (2013.01); *G06F 3/0619* (2013.01); *G06F 11/1441* (2013.01); *G06F 12/00* (2013.01); *G05B 2219/24137* (2013.01);
(Continued)

(58) Field of Classification Search
CPC ............ G06F 11/1441; G06F 11/2053; G06F 2212/1225; G06F 2212/032; G06F 2212/20022; G06F 2212/2028; G06F 2212/205; G05B 2219/24137;
(Continued)

(56) References Cited

U.S. PATENT DOCUMENTS

| | | | | |
|---|---|---|---|---|
| 3,866,182 A | * | 2/1975 | Yamada | ............... G06F 11/1666 |
| | | | | 711/162 |
| 4,627,000 A | * | 12/1986 | Germer | ................... G01R 21/00 |
| | | | | 324/103 R |

(Continued)

OTHER PUBLICATIONS

Wikipedia's Logical Block Addressing historical version from Jul. 12, 2015 https://en.wikipedia.org/w/index.php?title=Logical_block_addressing&oldid=671083811.*
(Continued)

*Primary Examiner* — Joseph O Schell
(74) *Attorney, Agent, or Firm* — Jackson Walker L.L.P.

(57) ABSTRACT

In accordance with embodiments of the present disclosure, an information handling system may include a primary persistent memory comprising a volatile memory for storing data and a non-volatile memory for receiving data transferred from the volatile memory in response to a power loss of the information handling system. The information handling system may also include an alternate persistent memory instructions embodied in non-transitory computer readable media, the instructions for causing a processor communicatively coupled to the primary persistent memory and the alternate persistent memory to, responsive to a vulnerability of a persistence of the primary persistent memory, transfer application data from the primary persistent memory to the alternate persistent memory.

24 Claims, 4 Drawing Sheets

(52) U.S. Cl.
CPC .............. *G05B 2219/24138* (2013.01); *G06F 11/1461* (2013.01); *G06F 11/2053* (2013.01); *G06F 2212/205* (2013.01)

(58) Field of Classification Search
CPC ........... G05B 2219/24138; G05B 2219/24139; G05B 2219/24141
See application file for complete search history.

(56) References Cited

U.S. PATENT DOCUMENTS

| | | | | |
|---|---|---|---|---|
| 5,197,026 A * | 3/1993 | Butler | ...................... | G11C 7/00 365/185.08 |
| 5,519,831 A * | 5/1996 | Holzhammer | ...... | G06F 11/1441 365/228 |
| 7,315,951 B2 * | 1/2008 | Hanrieder | .................. | G06F 1/30 711/162 |
| 7,318,138 B1 * | 1/2008 | Usgaonkar | .......... | G06F 11/2092 711/163 |
| 7,840,840 B2 * | 11/2010 | Takahashi | ............... | H02J 9/061 713/300 |
| 7,966,294 B1 * | 6/2011 | Gupta | ................... | G06F 3/0605 707/654 |
| 8,433,941 B2 * | 4/2013 | Wong | ........................ | G06F 1/30 713/300 |
| 9,141,505 B1 * | 9/2015 | Crow | .................. | G06F 11/3058 |
| 2003/0126494 A1 * | 7/2003 | Strasser | .............. | G06F 11/1441 714/6.2 |
| 2006/0015683 A1 * | 1/2006 | Ashmore | .............. | G06F 1/3203 711/113 |
| 2010/0008175 A1 * | 1/2010 | Sweere | ............... | G06F 12/0866 365/229 |
| 2010/0180065 A1 * | 7/2010 | Cherian | .............. | G06F 12/0804 711/103 |
| 2010/0262392 A1 * | 10/2010 | Murphy | ................ | G06F 3/0625 702/63 |
| 2012/0233472 A1 * | 9/2012 | Faraboschi | ......... | G06F 12/0246 713/190 |
| 2013/0030735 A1 * | 1/2013 | Jau | ........................... | G06F 1/30 702/63 |
| 2015/0082081 A1 * | 3/2015 | Akirav | ................ | G06F 11/1469 714/6.22 |
| 2015/0293714 A1 * | 10/2015 | Matsubara | .............. | G06F 12/00 711/162 |

OTHER PUBLICATIONS

Wikipedia's Operating Systems historical version from Aug. 21, 2015 https://en.wikipedia.org/w/index.php?title=Operating_system &oldid=677149661.*

Wikipedia's Mdadm historical version published Jun. 24, 2015 https://en.wikipedia.org/w/index.php?title=Mdadm&oldid=668396052.*

What happens during the shutdown process of an OS? by Stackoverflow published Feb. 28, 2010 https://stackoverflow.com/questions/2352698/what-happens-during-the-shutdown-process-of-an-os (Year: 2010).*

* cited by examiner

INFORMATION HANDLING SYSTEM WITH PERSISTENT MEMORY AND ALTERNATE PERSISTENT MEMORY

TECHNICAL FIELD

The present disclosure relates in general to information handling systems, and more particularly to systems and methods for providing an alternate persistent memory in the event of a vulnerability of the persistence of a persistent memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed either from an unexpected power loss, system crash or from a normal system shutdown. To enable such functionality while achieving high memory bandwidth and low memory latency equivalent to a standard volatile main memory, an NVDIMM may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM may supply electrical energy for a "save" operation to transfer data from the DRAM to the flash memory in response to a power loss event from the power supply unit.

In existing systems, in the event that a health status of an NVDIMM indicates that its energy storage device may be insufficient to complete a save operation in the event of a power failure, an application using persistent memory may shut down or initiate transfer of data to another information handling system, all of which may be undesirable.

SUMMARY

In accordance with the teachings of the present disclosure, the disadvantages and problems associated with existing approaches to providing an energy storage device for a persistent memory may be reduced or eliminated.

In accordance with embodiments of the present disclosure, an information handling system may include a primary persistent memory comprising a volatile memory for storing data and a non-volatile memory for receiving data transferred from the volatile memory in response to a power loss of the information handling system. The information handling system may also include an alternate persistent memory instructions embodied in non-transitory computer readable media, the instructions for causing a processor communicatively coupled to the primary persistent memory and the alternate persistent memory to, responsive to a vulnerability of a persistence of the primary persistent memory, transfer application data from the primary persistent memory to the alternate persistent memory.

In accordance with embodiments of the present disclosure, a method may include detecting a vulnerability of a persistence of a primary persistent memory comprising a volatile memory for storing data and a non-volatile memory for receiving data transferred from the volatile memory in response to a power loss of an information handling system, and responsive to the vulnerability, transferring application data from the primary persistent memory to an alternate persistent memory.

In accordance with embodiments of the present disclosure, an article of manufacture may include a non-transitory computer-readable medium and computer-executable instructions carried on the computer-readable medium, the instructions readable by a processor, the instructions, when read and executed, for causing the processor to detect a vulnerability of a persistence of a primary persistent memory comprising a volatile memory for storing data and a non-volatile memory for receiving data transferred from the volatile memory in response to a power loss of the information handling system, and responsive to the vulnerability, transfer application data from the primary persistent memory to an alternate persistent memory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
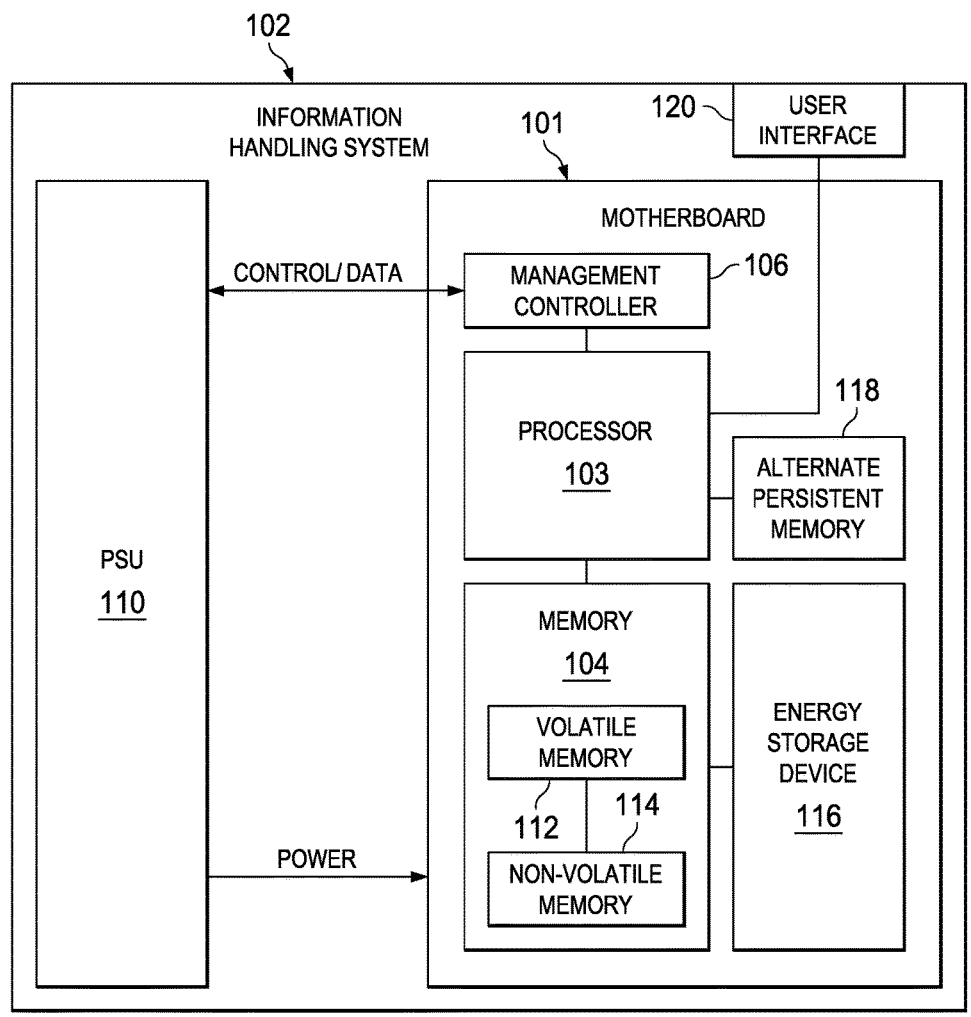
FIG. 1 illustrates a block diagram of an example information handling system, in accordance with embodiments of the present disclosure.

FIG. 1 illustrates a block diagram of an example of an information handling system 102. As depicted, information handling system 102 may include a power supply unit (PSU) 110, a motherboard 101, a user interface 120 and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, an energy storage device 116, an alternate persistent memory 118, a user interface 120, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In an embodiment, memory 104 may be implemented as a Dual In-line Memory Module (DIMM), and processor 103 may be communicatively coupled to a plurality of memory 104 DIMMs via a plurality of Dual Data Rate (DDR) memory channels. As shown in FIG. 1, in an embodiment, memory 104 may include a persistent memory (e.g., an NVDIMM) that includes a volatile memory 112 (e.g., DRAM, SRAM, or other volatile random-access memory) and non-volatile memory 114 (e.g., flash memory, STT MRAM memory, 3D XPoint memory, Phase Change memory, Resistive Memory, or other non-volatile memory). In some embodiments, volatile memory 112 and non-volatile memory 114 may reside on the same DIMM or memory module, but in other embodiments they may reside on separate modules. During normal operation, when PSU 110 provides adequate power to components of information handling system 102, data written to memory 104 from processor 103 may be stored in volatile memory 112. However, in the event of a loss of system input power or a power fault of PSU 110 that prevents delivery of electrical energy from PSU 110 to memory 104, or other events in which information handling system 102 may no longer continue normal operation, data stored in volatile memory 112 may be transferred to non-volatile memory 114 in a save operation. After input power is restored, or a faulty PSU 110 is replaced, such that PSU 110 is again operable to provide electrical energy to information handling resources of information handling system 102, on the subsequent power-on of information handling system 102, data may be copied from the non-volatile memory 114 back to volatile memory 112 via a restore operation. The combined actions of a data save and then a data restore operation may allow data of memory 104 to remain persistent through a power disruption (as seen by the operating system of system 102), and hence memory 104 to be considered persistent memory.

In other embodiments, memory 104 may be comprised of volatile memory 112 without a direct communicatively coupled non-volatile memory 114. In these and other embodiments, the non-volatile memory target for a save operation may be one or more devices located elsewhere within information handling system 102 (not explicitly shown in FIG. 1), such as via an input/output communications channel (e.g., Peripheral Component Interconnect Express channel, Serial Advanced Technology Attachment channel, etc.) to an adapter card, drive, or any other suitable device which processor 103 may access when copying data from volatile memory 112 to non-volatile memory 114. Any such arrangement that allows the volatile data of volatile memory 112 to be saved to a non-volatile device for cases where there is a power loss event at PSU 110, and subsequently restored after power is reapplied, may render memory 104 a persistent memory. Such architecture is sometimes known in the industry as "cache-to-flash". Accordingly, although not explicitly shown in FIG. 1, memory 104 may also include hardware, firmware, and/or software for carrying out save operations.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102.

Energy storage device 116 may comprise any system, device, or apparatus configured to store energy which may be used by memory 104 to perform save operations in response to a loss of input power source (e.g. alternating current or direct current), or fault of PSU 110, or other events in which information handling system 102 may no longer continue normal operation. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to memory 104 when needed to perform save operations (e.g., by closure of a switch to electrically couple such capacitor to components of memory 104). Although energy storage device 116 is shown in FIG. 1 as external to memory 104, in some embodiments energy storage device 116 may be integral to memory 104. In addition, although energy storage device 116 is shown in FIG. 1 as integral to motherboard 101, in some embodiments energy storage device 116 may be external to motherboard 101. In these and other embodiments, energy storage device 116 may be charged from PSU 110. In some embodiments, energy storage device 116 may be communicatively coupled to management controller 106 via a systems management interface such as, for example, Inter-Integrated Circuit (i2C), System Management Bus (SMBus) or Power Management Bus (PMBus), allowing management controller 106 to receive health and status (e.g., state of charge) from and/or communicate commands to energy storage device 116. In some embodiments, energy storage device 116 may provide energy to a plurality of persistent memories 104.

Alternate persistent memory 118 may be communicatively coupled to processor 103 and may comprise any system, device, or apparatus operable to retain program instructions or data for a period of time, and retain data after power to information handling system 102 is turned off, without reliance on energy storage device 116. Accordingly, alternate persistent memory 118 may comprise flash memory, magnetic storage, opto-magnetic storage, Phase Change memory, STT MRAM memory, Resistive memory, 3D Xpoint memory, some suitable types of NVDIMM memory, or any suitable selection and/or array of non-volatile memory that retains data after power to information handling system 102 is turned off. In operation, alternate persistent memory 118 may be used in lieu of memory 104 to store persistent data in the event of a health status of memory 104 indicating that the persistence of memory 104 may be vulnerable (e.g., state of charge of energy storage device 116 being too low to ensure persistence).

In some embodiments alternate persistent memory 118 may be implemented as one or a plurality of DIMMs on one or a plurality of DDR channels communicatively coupled to processor 103. Further, in some embodiments, DIMMs of persistent memory 104 and DIMMS of alternate persistent memory 118 may reside on the same DDR channel(s) communicatively coupled to processor 103. In other embodiments, memory 104 and persistent memory 118 may reside on the same DIMM or module. In some embodiments, persistent memory 104 and alternate persistent memory 118 may use a common non-volatile memory 114, such as on a suitable NVDIMM in which a portion of non-volatile memory 114 is reserved for holding the contents of volatile memory 112 for persistent memory save/restore operations, and another portion of non-volatile memory 114 is exposed as addressable memory accessible by processor 103, as an alternate persistent memory.

In the event of a health status of memory 104 indicating that the persistence of memory 104 may be vulnerable, rather than processor 103 writing data to volatile memory 112 of memory 104, processor 103 may be configured to write directly to alternate persistent memory 118. Other examples of alternate persistent memory 118 may include a non-volatile memory device (e.g., flash memory, hard disk drive, etc.) coupled to processor 103 via an input/output communications channel (e.g., Peripheral Component Interconnect Express channel, Serial Advanced Technology Attachment channel, etc.).

Although FIG. 1 depicts alternative persistent memory 118 as integral to information handling system 102, in some embodiments, alternative persistent memory 118 may reside on another information handling system (e.g., coupled to information handling system 102 via a network).

User interface 120 may be communicatively coupled to processor 103 and may comprise any instrumentality or aggregation of instrumentalities by which a user may interact with information handling system 102. For example, user interface 120 may permit a user to input data and/or instructions into information handling system 102, and/or otherwise manipulate information handling system 102 and its associated components. User interface 120 may also permit information handling system 102 to communicate data to a user, e.g., by way of a display device.

In addition to motherboard 101, processor 103, memory 104, management controller 106, energy storage device 116, PSU 110, alternate persistent memory 118, and user interface 120, information handling system 102 may include one or more other information handling resources. For example, in some embodiments, information handling system 102 may include more than one PSU 110 and/or more than one energy storage device 116.

Figure 2:
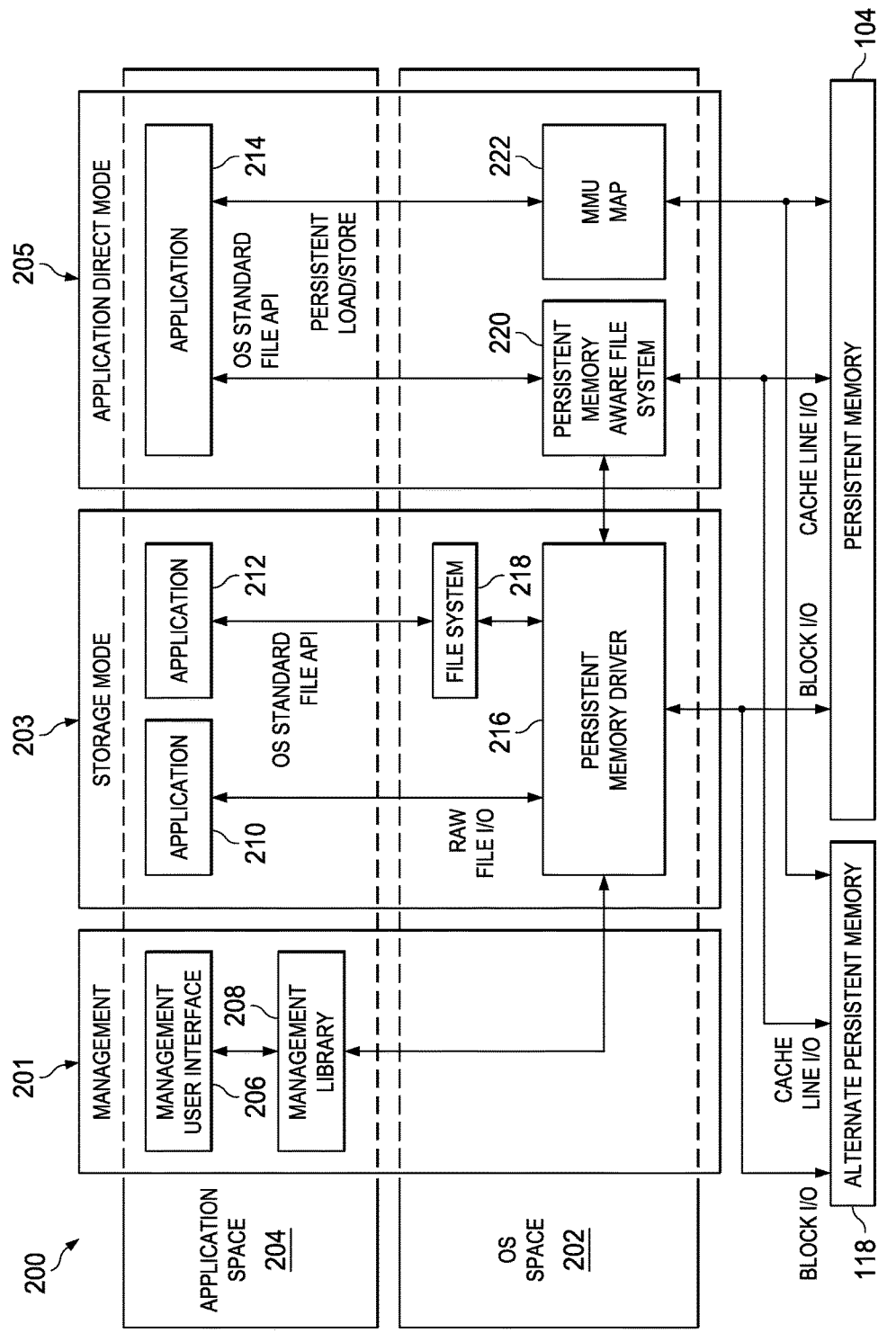
FIG. 2 illustrates a block diagram of an example software architecture for enabling a persistent memory and an alternate persistent memory, in accordance with embodiments of the present disclosure.

FIG. 2 illustrates a block diagram of an example software architecture 200 for enabling persistent memory 104 and alternate persistent memory 118, in accordance with embodiments of the present disclosure. As shown in FIG. 2, software architecture 200 may include an operating system (OS) space 202 which may include drivers and other software components which may execute on processor 103 for interfacing between applications executing on processor 103 "on top" of an OS and input/output (I/O) devices including memory 104 and alternate persistent memory 118. Software architecture 200 may include an application space 204 comprising applications (e.g., management user interface 206, management library 208, applications 210, 212, and 214) that may execute on top of the OS and which may issue I/O commands for performing persistent memory operations (e.g., reads and writes of data). As also shown in FIG. 2, software architecture 200 may also provide a management interface 201, a storage mode interface 203, and an application direct mode interface 205 for interfacing between applications executing in application space 204 on the one hand and memory 104 and alternate persistent memory 118 on the other hand. In other embodiments, OS space 202 may include a hierarchy of operating systems, hypervisors, containers, and/or other privileged software constructs that perform operating system functions.

Management interface 201 may include a management user interface 206 and a management library 208 which may be used by a user of information handling system 102 to manage parameters and policies for memory 104 and/or alternate persistent memory 118, including without limitation, overall memory allocation, prioritization, and privileges, and reporting overall health of memory 104 (e.g., state of charge of energy storage device 116) to other software (e.g., applications 210, 212, 214). An application wishing to allocate persistent memory within memory 104 may call a persistent memory driver 216 (e.g., directly, via file system 218, or via persistent memory aware file system 220) to allocate memory space, and receive virtual address ranges from OS memory management unit (MMU) mappings, raw file system handles, standard file handles, health and status information, and other parameters. If an application (e.g., application 210) desires to use persistent memory 104 as a raw file in storage mode 203, it may perform file I/O directly via persistent memory driver 216. If an application (e.g., application 212) desires to use persistent memory 104 as a block I/O device in storage mode 203, such application may make calls to persistent memory driver 216 via a file system 218 of the OS to perform block I/O. If an application (e.g., application 214) desires to use persistent memory 104 as a load/store memory in application direct mode 205, it may perform byte-level load/stores via persistent memory aware file system 220 and/or MMU map 222 of application direct mode 205.

In operation, software architecture 200 may also be configured to failover and/or re-target persistent memory 104 to alternate persistent memory 118 in the event of a health status rendering the persistence of memory 104 vulnerable (e.g., low state of charge of energy storage device 116), as described in greater detail below.

Figure 3:
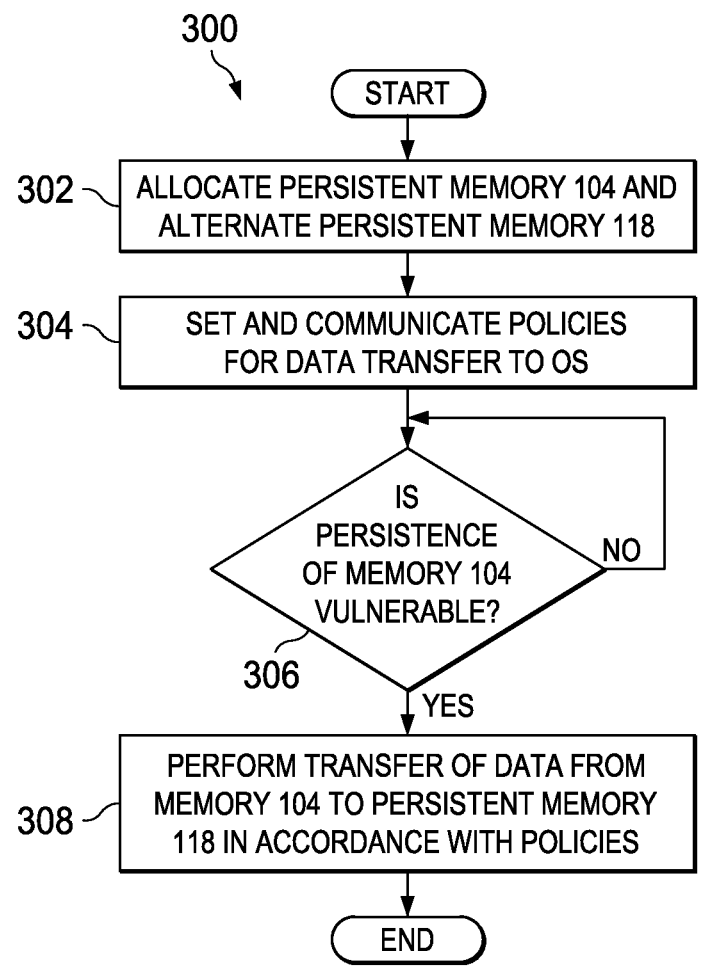
FIG. 3 illustrates a flow chart of an example method for allocating and managing persistent memory, in accordance with embodiments of the present disclosure.

FIG. 3 illustrates a flow chart of an example method 300 for allocating and managing persistent memory, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, an application (e.g., application 210, 212, 214) may allocate a portion of persistent memory 104 in order to read and write persistent data. When making such allocation, the application may also specify one or more alternate persistent memories 118, or a portion thereof, to be reserved for the application by an OS upon which the application is executing (and the OS may in turn make such reservation). Allocation and initialization of alternate persistent memory 118 concurrent with allocation of memory 104 may advantageously allow alternate persistent memory 118 to be ready for use in the event that the persistence of primary memory 104 becomes vulnerable.

At step 304, the application may set and communicate to the OS policies with respect to transfer of data from memory 104 to alternate persistent memory 118 in the event of vulnerability to the persistence of memory 104. Such policies may include, without limitation, whether the application or the OS will perform a transfer of data from memory 104 to alternate persistent memory 118 in the event of vulnerability of memory 104, whether the OS must suspend execution of the application during such transfer, and whether the application requires load/store to load/store memory access to persistent memory 118, block I/O to load/store memory access to persistent memory 118, load/store to block I/O memory access to persistent memory 118, or block I/O to block I/O memory access to persistent memory 118.

At step 306, the application and/or the OS may determine if persistence of memory 104 has become vulnerable. In some embodiments, the OS may directly monitor health of energy storage device 116. In some embodiments, management controller 106 may poll energy storage device 116 or configure energy storage device 116 to interrupt management controller 106 upon a degraded threshold being reached or an all-out failure, after which management controller 106 may interrupt the OS. If persistence of memory 104 has become vulnerable, method 300 may proceed to step 308. Otherwise, method 300 may remain at step 306 until persistence of memory 104 becomes vulnerable.

At step 308, the application and/or the OS may perform transfer of data from memory 104 to persistent memory 118 in accordance with the policies set by the application (e.g., at step 304). For example, when a policy dictates that the application be suspended, the OS may suspend the application, and perform OS-level transfers between memory 104 and alternate persistent memory 118 via direct memory access engines, memory controller hardware or microcode-based data handling engines, processor move instructions, and/or other suitable methods. In some embodiments, the OS may initiate a background process to perform the transfer, while the application continues running, with the understanding that the application will no longer write to the "old" range in memory 104. After completion of step 308, method 300 may end, and method 400 as described below may execute.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media. For example, method 300 may be performed by one or more components of software architecture 200 executing on processor 103.

Figure 4:
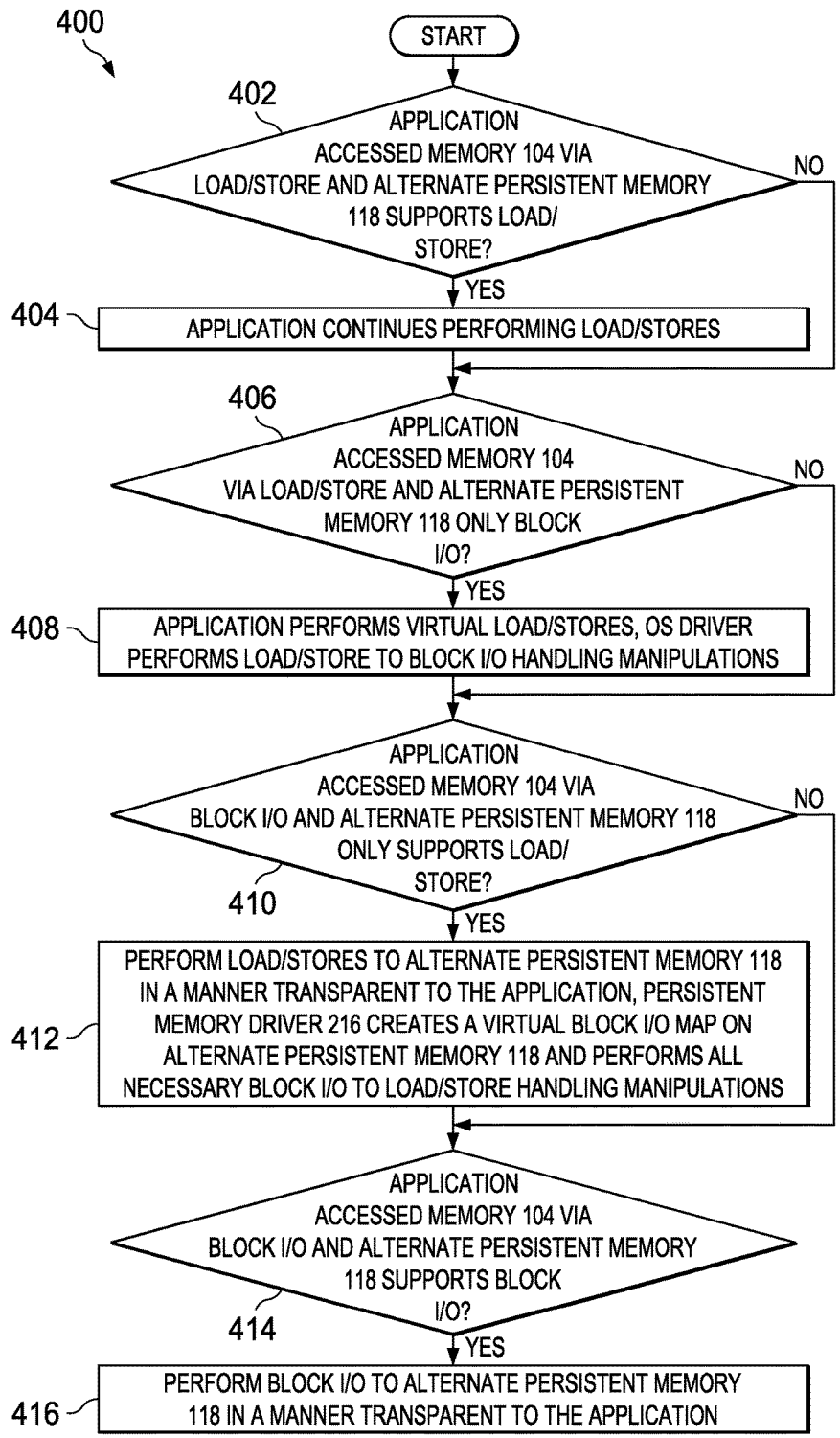
FIG. 4 illustrates a flow chart of an example method for performing input/output operations to alternate persistent memory, in accordance with embodiments of the present disclosure.

FIG. 4 illustrates a flow chart of an example method 400 for performing input/output operations to alternate persistent memory 118, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, the application and/or OS may determine if the application accessed memory 104 via load/store and whether alternate persistent memory 118 supports load/store. If the application accessed memory 104 via load/store and alternate persistent memory 118 supports load/store, method 400 may proceed to step 404. Otherwise, method 400 may proceed to step 406.

At step 404, in response to a determination that the application accessed memory 104 via load/store and alternate persistent memory 118 supports load/store, the application may continue performing load/stores as the OS may remap the new alternate persistent memory to the former virtual address range(s) used by the application by updating mappings of MMU 222 of information handling system 102. Such method would be "invisible" to the application, as the application may continue without any changes required to its memory referencing. In alternate embodiments, the OS may allocate a new set of virtual addresses to the application, and the application would use this new set of addresses. In such embodiments, standard OS page fault handling mechanisms may be used to ensure old references are trapped. In these embodiments, the application may be suspended until all of MMU 222 updates are complete.

At step 406, the application and/or OS may determine if the application accessed memory 104 via load/store and whether alternate persistent memory 118 only supports block I/O. If the application accessed memory 104 via load/store and alternate persistent memory 118 only supports block I/O, method 400 may proceed to step 408. Otherwise, method 400 may proceed to step 410.

At step 408, in response to a determination that the application accessed memory 104 via load/store and alternate persistent memory 118 only supports block I/O, the application may call a special OS driver or special functionality of an existing OS driver to continue performing virtual load/stores. In such case, such OS driver may perform load/store to block I/O handling translations and/or manipulations. In addition, the OS may create a virtual load/store area within each I/O block, which may hide any block I/O-specific checking and error handling from the application.

At step 410, the application and/or OS may determine if the application accessed memory 104 via block I/O and whether alternate persistent memory 118 only supports load/store. If the application accessed memory 104 via block I/O and alternate persistent memory 118 only supports load/store, method 400 may proceed to step 412. Otherwise, method 400 may proceed to step 414.

At step 412, in response to a determination that the application accessed memory 104 via block I/O and alternate persistent memory 118 only supports load/store, persistent memory driver 216 may simply perform load/stores to alternate persistent memory 118 in a manner transparent to the application. In such case, persistent memory driver 216 may create a virtual block I/O map on alternate persistent memory 118 and perform all necessary block I/O to load/store handling manipulations.

At step 414, the application and/or OS may determine if the application accessed memory 104 via block I/O and whether alternate persistent memory 118 supports block I/O. If the application accessed memory 104 via block I/O and alternate persistent memory 118 supports block I/O, method 400 may proceed to step 416.

At step 416, in response to a determination that the application accessed memory 104 via block I/O and alternate persistent memory 118 supports block I/O, persistent memory driver 216 may simply perform block I/O to alternate persistent memory 118 in a manner transparent to the application. In such case, persistent memory driver 216 may perform block I/O to block I/O handling manipulations if needed, or simply directly pass the block I/O to alternate persistent memory 118. For the case in which the block I/O sizes are different between memory 104 and alternate persistent memory 118, persistent memory driver 216 may convert the block I/O into multiple block I/O calls as necessary, including performing "read-modify-writes" for application writes where the block size of alternate persistent memory 118 is greater than the block size of memory 104.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media. For example, method 400 may be performed by one or more components of software architecture 200 executing on processor 103.

In each of the above cases in which alternate persistent memory 118 is a block I/O device, it may be advantageous for persistent memory driver 216 to support write performance optimization by holding application writes in kernel memory for a small amount of time to accumulate additional write data within a block before writing the block to alternate persistent memory 118. Once the write occurs to alternate persistent memory 118, a "commit" notification may be returned to the application to indicate the write is now persistent. Additional optimizations may include providing health parameters associated with alternate persistent memory 118 (e.g., useful life estimation), in order to not exceed the write endurance of alternate persistent memory 118. Persistent memory driver 216 may also perform speculative block I/O reads in order to speed up read performance, where entire blocks may be held in volatile memory 112 for quick access. If such optimization is supported, the OS may need to check new write requests against such read block cache in order to maintain memory coherence.

If, after utilization of alternate persistent memory 118, the persistence of memory 104 is restored, analogous methods to those described above may be used to transfer data from alternate persistent memory 118 to memory 104, and then allow the application to operate as normally.

The systems and methods described above may allow an application to gracefully transfer data from a primary persistent memory to an alternate persistent memory. Among the advantages of such an alternate persistent memory is that it provides for higher availability over existing approaches in which an application might shut down or have to be transferred to another information handling system in the event of persistence vulnerability. In addition, systems and methods described herein may reduce cost and/or complexity of an energy storage device or energy hold-up subsystem for platforms that cannot support redundant batteries or hot-swappable batteries.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a primary persistent memory comprising:
      a volatile memory for storing data; and
      a non-volatile memory for receiving data transferred from the volatile memory in response to a power loss of the information handling system;
   an alternate persistent memory; and
   instructions embodied in non-transitory computer readable media, the instructions for causing a processor communicatively coupled to the primary persistent memory and the alternate persistent memory to, responsive to a vulnerability of a persistence of the primary persistent memory, transfer application data from the primary persistent memory to the alternate persistent memory, wherein the vulnerability is based on an indication that an energy storage device contains insufficient energy to allow for the data to be entirely transferred from the volatile memory to the non-volatile memory should the power loss of the information handling system occur, and wherein the indication occurs prior to the occurrence of the power loss of the information handling system.

2. The information handling system of claim 1, wherein the instructions comprise an application executing on an operating system executing on the processor, and the application is configured to transfer the application data from the primary persistent memory to the alternate persistent memory.

3. The information handling system of claim 1, wherein the instructions comprise a portion of an operating system executing on the processor, and the operating system is configured to transfer the application data from the primary persistent memory to the alternate persistent memory.

4. The information handling system of claim 3, wherein the operating system is further configured to suspend an application associated with the application data during transfer of the application data from the primary persistent memory to the alternate persistent memory.

5. The information handling system of claim 1, wherein the instructions are further configured to cause the processor to, responsive to completion of the transfer of the application data from the primary persistent memory to the alternate persistent memory, perform input/output (I/O) between an application associated with the application data and the alternate persistent memory.

6. The information handling system of claim 5, wherein the instructions are further configured to cause the processor to transform load/store I/O of the application into block I/O of the alternate persistent memory.

7. The information handling system of claim 5, wherein the instructions are further configured to cause the processor to transform block I/O of the application into load/store I/O of the alternate persistent memory.

8. The information handling system of claim 1, wherein the instructions are further configured to cause the processor to transfer data from the alternate persistent memory to the primary persistent memory in response to persistence of the primary persistent memory being restored.

9. A method, comprising:
   detecting a vulnerability of a persistence of a primary persistent memory that comprises a volatile memory for storing data and a non-volatile memory for receiving data transferred from the volatile memory in response to a power loss of an information handling system; and
   responsive to the vulnerability, transferring application data from the primary persistent memory to an alternate persistent memory;
   wherein the vulnerability is based on an indication that an energy storage device contains insufficient energy to allow for the data to be entirely transferred from the volatile memory to the non-volatile memory should the power loss of the information handling system occur, and wherein the indication occurs prior to the power loss of the information handling system.

10. The method of claim 9, wherein the transferring comprises an application executing on an operating system transferring the application data from the primary persistent memory to the alternate persistent memory.

11. The method of claim 9, wherein the transferring comprises an operating system transferring the application data from the primary persistent memory to the alternate persistent memory.

12. The method of claim 11, further comprising suspending, by the operating system, an application associated with the application data during transfer of the application data from the primary persistent memory to the alternate persistent memory.

13. The method of claim 9, further comprising, responsive to completion of the transfer of the application data from the primary persistent memory to the alternate persistent memory, performing input/output (I/O) between an application associated with the application data and the alternate persistent memory.

14. The method of claim 13, further comprising transforming load/store I/O of the application into block I/O of the alternate persistent memory.

15. The method of claim 13, further comprising transforming block I/O of the application into load/store I/O of the alternate persistent memory.

16. The method of claim 9, further comprising transferring data from the alternate persistent memory to the primary persistent memory in response to persistence of the primary persistent memory being restored.

17. An article of manufacture comprising:
a non-transitory computer-readable medium; and
computer-executable instructions carried on the computer-readable medium, the instructions readable by a processor, the instructions executable by the processor to:
detect a vulnerability of a persistence of a primary persistent memory, the primary persistent memory comprising a volatile memory for storing data and a non-volatile memory for receiving data transferred from the volatile memory in response to a power loss of an information handling system; and
responsive to the vulnerability, transfer application data from the primary persistent memory to an alternate persistent memory;
wherein the vulnerability is based on an indication that an energy storage device contains insufficient energy to allow for the data to be entirely transferred from the volatile memory to the non-volatile memory should the power loss of the information handling system occur, and wherein the indication occurs prior to the power loss of the information handling system.

18. The article of claim 17, wherein the instructions comprise an application executing on an operating system executing on the processor, and the application is configured to transfer the application data from the primary persistent memory to the alternate persistent memory.

19. The article of claim 17, wherein the instructions comprise a portion of an operating system executing on the processor, and the operating system is configured to transfer the application data from the primary persistent memory to the alternate persistent memory.

20. The article of claim 19, wherein the operating system is further configured to suspend an application associated with the application data during transfer of the application data from the primary persistent memory to the alternate persistent memory.

21. The article of claim 17, wherein the instructions are further configured to cause the processor to, responsive to completion of the transfer of the application data from the primary persistent memory to the alternate persistent memory, perform input/output (I/O) between an application associated with the application data and the alternate persistent memory.

22. The article of claim 21, wherein the instructions are further configured to cause the processor to transform load/store I/O of the application into block I/O of the alternate persistent memory.

23. The article of claim 21, wherein the instructions are further configured to cause the processor to transform block I/O of the application into load/store I/O of the alternate persistent memory.

24. The article of claim 17, wherein the instructions are further configured to cause transfer of data from the alternate persistent memory to the primary persistent memory in response to persistence of the primary persistent memory being restored.

* * * * *